United States Patent [19]

Tazartes et al.

[11] Patent Number: 4,981,359
[45] Date of Patent: Jan. 1, 1991

[54] RING LASER GYROSCOPE DITHER DRIVE SYSTEM AND METHOD

[75] Inventors: Daniel A. Tazartes, West Hills; John G. Mark, Pasadena; Robert E. Ebner, Tarzana, all of Calif.

[73] Assignee: Litton Systems, Inc., Beverly Hills, Calif.

[21] Appl. No.: 367,957

[22] Filed: Jun. 19, 1989

[51] Int. Cl.$^5$ .............................................. G01C 19/64
[52] U.S. Cl. ................................................... 356/350
[58] Field of Search ........................................ 356/350

[56] References Cited

U.S. PATENT DOCUMENTS

| | | | |
|---|---|---|---|
| 3,467,472 | 9/1969 | Killpatrick | 356/106 |
| 3,743,969 | 7/1973 | Hutchings | 332/7.51 |
| 4,248,534 | 2/1981 | Elbert | 356/350 |
| 4,309,107 | 1/1982 | McNair et al. | 356/350 |
| 4,314,174 | 2/1982 | Wing et al. | 310/315 |
| 4,422,762 | 12/1983 | Hutchings et al. | 356/350 |
| 4,473,297 | 9/1984 | Simpson et al. | |
| 4,529,311 | 7/1985 | Morgan et al. | 356/350 |
| 4,584,652 | 4/1986 | Sturza et al. | 364/484 |
| 4,597,667 | 7/1986 | Curby et al. | 356/350 |
| 4,740,084 | 4/1988 | Curby et al. | 356/350 |
| 4,801,206 | 1/1989 | Benoist | 356/350 |

OTHER PUBLICATIONS

Coccoli, "An Overview of Laser Gyros," presented at Twelfth Joint Services Data Exchange for Inertial Systems, pub. Aug. 1978.
Killpatrick, "The laser gyro," reprinted from IEEE Spectrum, Oct. 1967, pp. 44-55.
Hammons & Ashby, "Mechanically Dithered RLG at the Quantum Limit," IEEE 1982, pp. 38-392.

Primary Examiner—Vincent P. McGraw
Assistant Examiner—S. A. Turner
Attorney, Agent, or Firm—Lynn & Lynn

[57] ABSTRACT

A dither drive system for a ring laser gyroscope includes a computer, a digital to analog converter, a filter, and a power amplifier. The system senses the dither frequency of the gyro frame and produces a digital signal that corresponds to a specified dither drive signal and toggles the dither drive signal to drive the flexure at its resonant frequency. The dither drive system generates digital waveforms that approximate the sine function and digital waveforms that approximate the cosine function and applies the digital waveforms in quadrature to the flexure.

20 Claims, 8 Drawing Sheets

SINE
TRI-STATE

FIG. 9(A)

COSINE TRI-STATE

FIG. 9(B)

COMBINATION
DRIVE

RING LASER GYROSCOPE DITHER DRIVE SYSTEM AND METHOD

BACKGROUND OF THE INVENTION

This invention relates generally to rotation sensors and particularly to ring laser gyroscope rotation sensors. This invention relates particularly to dither drive apparatus and methods for preventing mode locking in ring laser gyroscopes. Still more particularly, this invention is directed to a dither drive technique that uses computer-generated signals to control a set of piezoelectric torquers that dither a ring laser gyroscope.

A ring laser gyroscope employs the Sagnac effect to detect rotation. Counter-propagating light beams in a closed loop will have transit times that differ in direct proportion to the rotation rate of the loop about an axis perpendicular to the plane of the loop. The ring laser gyroscope uses the resonant properties of a closed cavity to convert the Sagnac phase difference between the counterpropagating beams into a frequency difference. In an active ring laser gyroscope the cavity defined by the closed optical path becomes an oscillator, and output beams from the two directions interfere to give a beat frequency that is a measure of the rotation rate. The high optical frequencies of about $10^{15}$ Hz for light used in ring laser gyroscopes cause the minute phase changes to become beat frequencies that are readily measured.

When the rotation rate of a ring laser gyroscope is within a certain range, the frequency difference between the beams disappears. This phenomenon is called frequency lock-in, or mode locking, and is a major difficulty with the ring laser gyroscope because at low rotation rates it causes a false indication that the device is not rotating. The range of rotation rates over which lock-in occurs is the deadband of the ring laser gyroscope.

Lock-in arises from coupling of light between the beams. The coupling results primarily from backscatter off the mirrors that confine the beams to the closed path. Backscatter causes the beam in each direction to include a small component having the frequency of the beam propagating in the other direction. The lock-in effect in a ring laser gyroscope is similar to the coupling that has long been observed and understood in conventional electronic oscillators.

Any inability to accurately measure low rotation rates reduces the effectiveness of a ring laser gyroscope in a navigational system. There has been a substantial amount of research and development work to reduce or eliminate the effects of lock-in and to enhance the effective use of ring laser gyroscopes in such systems.

There are several known approaches to solving the problems of lock-in. Various biasing techniques have been employed to avoid the dead band so that lock-in would not be a problem in ring laser gyroscope operation. Biasing techniques can be divided into mechanical and optical techniques and into fixed and dithered bias techniques.

One approach involves mechanically oscillating the ring laser gyroscope about its sensor axis so that the device is constantly sweeping through the deadband. This mechanical oscillation of the ring laser gyroscope is usually called dithering. A typical ring laser gyroscope may be dithered at about 400 Hz with an angular displacement of a few arc minutes.

The amplitude of the dithering must be carefully controlled and monitored to minimize the effects of lock-in. Since the dither oscillation angular velocity and displacement relative to a support structure can be constantly monitored, they may be excluded from the output signal of the ring laser gyroscope. However, it has been found that a constant dithering amplitude is inadequate to eliminate all of the effects of lock-in.

Another approach to reducing lock-in error is to superimpose a random signal upon the amplitude of the dither driving amplifier. A random bias technique is described in U.S. Pat. No. 3,467,472. Several rather severe disadvantages to the random bias technique have been found, however. The phase error, even though randomized by the technique described in this patent, is not eliminated and still remains a relatively large source of error.

When the sign of the frequency difference reverses, the two beams tend to lock-in since at some point the frequency difference between the beams is zero. Since the output angle of the ring laser gyroscope is generally derived from the frequency difference, which locks in to indicate a zero rotation rate even if the actual rotation rate is non-zero, an error accumulates in the output angle. The periods of time when the two beams are locked in are usually very short so that the resulting output angle error is very small for any single sign change. Nevertheless, the error resulting from lock-in during sign reversal of the frequency difference is cumulative, and in time may become significant, particularly in precision navigational systems. This error is usually the major contributor to the random walk or random drift.

U.S. Pat. No. 4,529,311 to Morgan et al. is directed to a dithered ring laser gyro system in which the phase relationship between a pair of beams is accounted for. This phase may be used in a feedback loop for error control or it may be utilized to generate a set of error parameters for error correction. Morgan et al. regards the phase offset and the coupling efficiency of the two beams as being independent of time and temperature. However, the phase offset and the beam coupling efficiency are time and temperature dependent, which limits the accuracy of the error correction disclosed in Morgan et al.

U.S. Pat. No. 4,248,534 to Elbert is directed to the elimination of errors induced in dithered ring laser gyroscopes. Elbert discloses the use of a regression algorithm for minimizing lock-in. For a short time on both sides of zero velocity a trace of the rotation rate is stored in a computer memory. When there is no lock-in, this trace is a parabola. Deviations from the parabola are indicative of the lock-in rate.

U.S. Pat. No. 4,473,297 to Simpson et al. is directed to the use of phase differences between the alternating components in the counterpropagating beams to minimize lockin in a ring laser gyroscope. Signals indicative of the phase differences in the separate beams are input to a mirror driver circuit that drives two cavity length control mirrors to control the phase difference. Simpson et al discloses that the preferred phase difference between the beams for minimum lock-in is 180°.

In present dithered ring laser gyroscope systems, elaborate dither drive hardware is used to generate the proper frequency and amplitude for the signals applied to the piezoelectric transducers. A navigation system must include sensors for measuring rotations about three mutually orthogonal axes. Three ring laser gyroscopes may be mounted on an instrument block on three mutually orthogonal surfaces to measure rotations of the device in which the instrument block is mounted. Lines perpendicular to these surfaces define the sensing axes of the three gyros.

Unfortunately dithering one of the ring laser gyros can cause the sensing axes of the other two gyros to deviate from the desired lines. This deviation of the sensing axes is known as "coning" because the sensing axis of each gyro moves to define a cone centered on the line that defines the desired orientation of the sensing axis. U.S. patent application No. 740,371, filed June 3, 1985 discloses a dither drive system in which computer generated signals are used to reduce coning. That application discloses driving each gyro with a drive signal having a distinct frequency; generating a signal indicative of the coning motion of each gyro; demodulating the signals to determine the components of the motion that are not about the desired sensing axis; deriving virtual drive signal components corresponding to the the off-axis components; and combining the virtual drive signal components with the drive signals to reduce the off axis-components.

SUMMARY OF THE INVENTION

The present invention provides a dither drive system that avoids the necessity of using much of the expensive hardware included in previous systems. A dither drive system according to the present invention includes a computer, a digital to analog converter, a filter, and a power amplifier.

A dither drive system according to the invention for a ring laser gyroscope includes a frame mounted to a flexure such that the frame and flexure and flexure comprise a mechanical system having a known resonant frequency. The flexure is mounted between a base and the frame such that the frame may be dithered relative to the base. The dither drive system comprises means for sensing the frequency of the dither, means for producing a digital signal that corresponds to a specified dither drive signal, means for converting the digital signal into a corresponding analog dither drive signal, and means for toggling the dither drive signal to drive the flexure and frame system at its resonant frequency.

The means for producing a digital signal that corresponds to a specified dither drive signal may comprise a read only memory that functions as a sine look-up table.

The system of the invention may further comprise means for generating a sine digital two-state or tri-state waveform that approximates the sine function, means for generating a cosine digital two-state or tri-state waveform that approximates the cosine function, and means for applying voltages indicative of the sine and cosine waveforms in quadrature to the flexure.

A dither drive system according to the invention may also comprise means for forming a digital signal formed from of the dither oscillations; means for producing a first digital waveform that corresponds to a first specified dither drive signal and frequency, the first digital waveform being in-phase with the digital signal indicative of the dither; means for producing a second digital waveform that corresponds to a second specified dither drive signal and frequency, the second digital waveform being in quadrature with the digital signal indicative of the dither; means for driving the flexure with analog signals indicative of the first and second digital waveforms; means for demodulating the digital signal indicative of the dither oscillations with the first digital waveform to obtain an in-phase error signal; means for demodulating the digital signal indicative of the dither oscillations with the second digital waveform to obtain a quadrature phase error signal; and means for nulling the quadrature phase error signal and servoing the in-phase error signal to a predetermined reference value.

The method according to the invention for controlling a dither drive system for a ring laser gyroscope that includes a frame mounted to a flexure such that the frame and flexure and flexure comprise a mechanical system having a known resonant frequency, the flexure being mounted between a base and the frame such that the frame may be dithered relative to the base comprises the steps of sensing the frequency of the dither, producing a digital signal that corresponds to a specified dither drive signal, converting the digital signal into a corresponding analog dither drive signal, and toggling the dither drive signal to drive the flexure at its resonant frequency.

The step of producing a digital signal that corresponds to a specified dither drive signal may comprise the step of applying an index to a read only memory that functions as a sine look-up table.

The method of the invention may further comprise the steps of generating a sine digital two-state or tri-state waveform that approximates the sine function, generating a cosine digital two-state or tri-state waveform that approximates the cosine function, and applying signals indicative of these quadrature sine and cosine waveforms to the flexure.

The method of the invention may comprise the steps of: forming a digital signal indicative of the dither oscillations; producing a first digital waveform that corresponds to a first specified dither drive signal, the first digital waveform being in-phase with the digital signal indicative of the dither; producing a second digital waveform that corresponds to a second specified dither drive signal, the second digital waveform being in quadrature with the digital signal indicative of the dither; driving the flexure with analog signals indicative of the first and second digital waveforms; demodulating the digital signal indicative of the dither oscillations with the first digital waveform to obtain an in-phase error signal; demodulating the digital signal indicative of the dither oscillations with the second digital waveform to obtain a quadrature phase error signal; and nulling the quadrature phase error signal and servoing the in-phase error signal to a predetermined reference value.

DESCRIPTION OF THE PREFERRED EMBODIMENT

Figure 1:
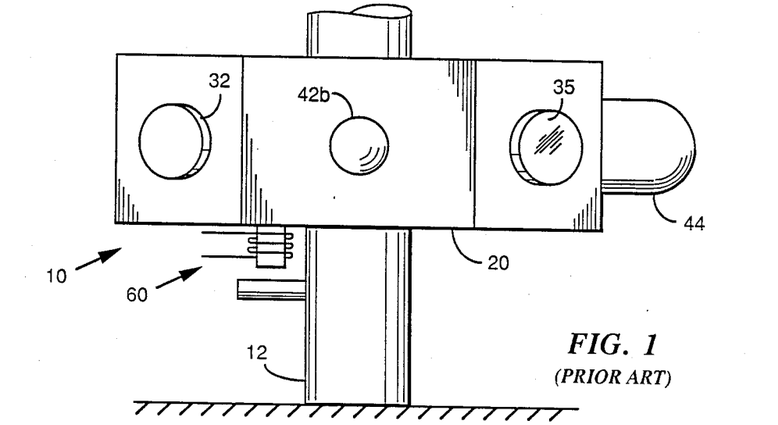
FIG. 1 is a perspective view of a ring laser gyroscope mounted upon a supporting structure.
Figure 2:
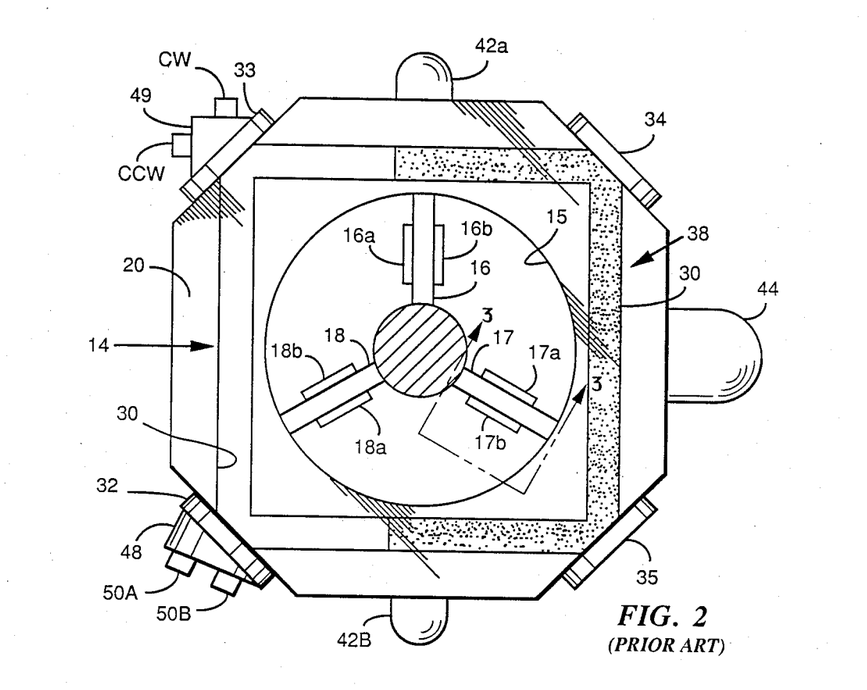
FIG. 2 is a plan view of the ring laser gyroscope of FIG. 1.

Referring to FIGS. 1 and 2, a ring laser gyroscope 10 is mounted on a support 12. The ring laser gyroscope 10 is exemplary of many such devices with which the present invention may be practiced and does not limit the present invention to the particular embodiment of the ring laser gyroscope 10 shown in FIGS. 1 and 2 and described herein.

The ring laser gyroscope 10 is supported by a flexure mechanism 14 mounted in a central hole 15 in a frame 20. The flexure mechanism 14 may comprise a plurality of springs 16-18 connected between the frame 20 and the support 12. The illustrated embodiment includes three springs, but the invention may be practiced with any number of springs. Referring to FIG. 2, the springs 16-18 may be formed as thin rectangles; but the present invention is not limited in its applicability to springs having such configurations.

Referring to FIG. 2, a pair of piezoelectric wafers 16A, 16B, 17A, 17B, 18A and 18B are mounted on the springs 16-18, respectively. All of the spring and wafer combinations are essentially the same; therefore, only spring 16 and piezoelectric wafers 16A and 16B are described herein. The piezoelectric wafers 16A and 16B have generally rectangular configurations and are mounted on the opposite side of the spring 16. The piezoelectric wafers 16A and 16B preferably are mounted to the spring 16 by a suitable bonding agent.

The piezoelectric wafer 16A is poled such that application of a driving signal across it causes the piezoelectric wafer 16A to selectively expand or contract. The piezoelectric wafer 16B is also poled and has a pair of opposing electrodes 26 and 28 connected thereto. The piezoelectric wafers 16A and 16B may have opposite polarities so that application of the same driving signal thereto causes one wafer, for example wafer 16A, to expand while the other wafer 16B contracts. If the wafers 16A and 16B have the same polarities, then the driving voltages must have opposite polarities in order to achieve the desired effect of alternately expanding and contracting. The piezoelectric wafers 17A, 17B, 18A and 18B have polarities and driving voltages substantially identical to the piezoelectric wafers 16A and 16B, respectively. Therefore if the piezoelectric wafers 16A, 17A and 18A contract while the piezoelectric wafer 16B, 17B and 18B expand, the springs 16, 17 and 18 will deform so that the frame 20 rotates clockwise about the support 12. A change in sign of the driving signal causes a counterclockwise rotation of the frame 20 about the support 12.

Referring to FIG. 2, a cavity 30 formed in the frame 20 extends between a plurality of mirrors 32-35, which guide light around a closed path inside the cavity 30. A gain medium 38 is confined inside the cavity 30. The gain medium is typically comprised of a mixture of helium and neon gases. Application of an excitation signal to a pair of anodes 42a and 42b and a cathode 44 causes energy level transitions in the gas mixture, as is well-known, to produce counterpropagating coherent light beams in the cavity 30.

The two counterpropagating beams undergo a rotation induced phase shift in circulating around the cavity 30 by successive reflection from the mirrors 32-35 as the cavity 30 rotates about its normal axis. The rate of change of the difference in the phase of the two counterpropagating beams is indicative of the rotation rate of the ring laser gyroscope 10 about its normal axis. Since the cavity 30 acts as a resonant cavity to the two beams, the frequency of each beam is sharply defined so that the phase shift changes are detectable.

One of the mirrors, for example the mirror 32, is partly transmissive so that a portion of each beam enters a prism 48 mounted to the back of the mirror 32. The prism 48 is formed to combine, or heterodyne, the counterpropagating beams so that they interfere with one another before impinging upon a pair of photodetectors 50A and 50B.

Figure 3A:
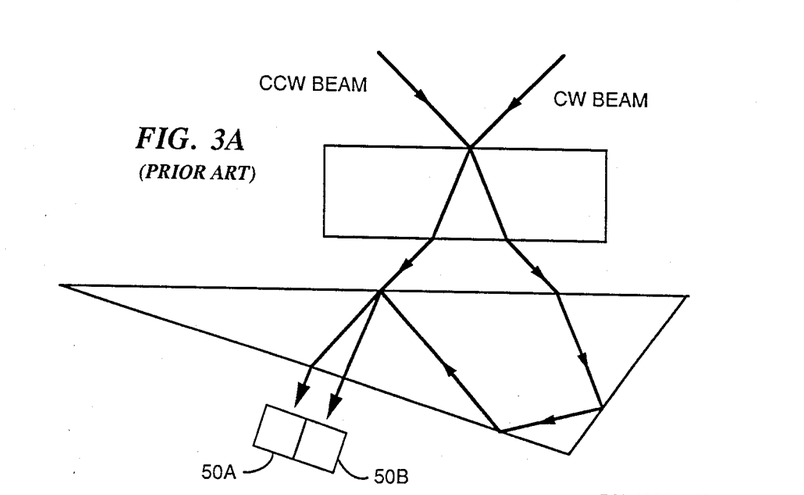
FIG. 3A illustrates formation of heterodyne signal outputs from the ring laser gyroscope of FIGS. 1 and 2.
Figure 3B:
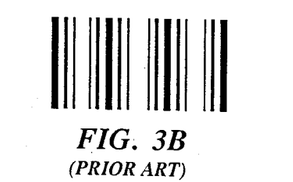
FIG. 3B illustrates intensity variations in the heterodyne signals output from the ring laser gyroscope of FIGS. 1 and 2.

FIG. 3A illustrates a detailed view of the transmissive mirror 32 and the combining prism 48. Part of each of the clockwise and counterclockwise beams travels through the mirror 32 and impinges upon the prism 48. The prism angles and the prism orientation cooperate, causing internal reflections of one of the beams so that the beams are essentially parallel when they emerge from the prism 48. The electromagnetic fields of the beams thus add together to form an interference pattern of bright and dark fringes as shown in FIG. 3B. A pair of photodetectors 50A and 50B detect the intensity of the combined beams. The outputs of the detectors are referenced herein as heterodyne signal A, or Het A and heterodyne signal B, or Het B, respectively. A frequency difference between the clockwise beam and the counterclockwise beam caused by rotation of the gyro will be seen as motion of the interference pattern across the detectors 50A and 50B Accordingly, the direction of motion of the fringes identifies the direction of rotation. Each full cycle of the interference pattern corresponds to $2\pi$ radians of phase, or a cycle of the beat frequency, and therefore corresponds to a fixed angular rotation increment. Each occurrence of a full cycle of the interference pattern generates a signal called a heterodyne count. For a ring laser gyroscope 10 having a 28 cm path length, the scale factor is about 1.8 arc seconds of rotation per heterodyne count.

Figure 4:
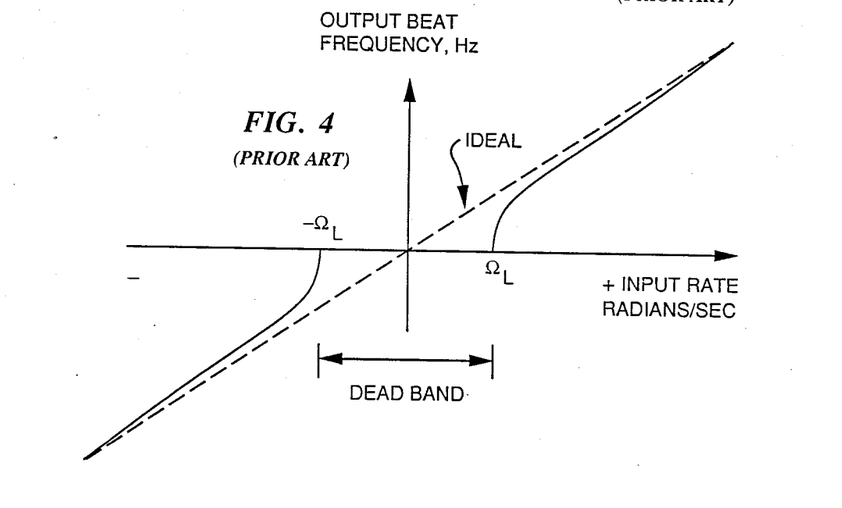
FIG. 4 graphically illustrates the output beat frequency of a ring laser gyroscope as a function of rotation rate.

The frequency of the beat signal produced when the two frequencies heterodyne at the detectors 50A and 50B is directly proportional to the rotation rate of the ring laser gyroscope 10 about its normal axis. Referring to FIG. 4, when the rotation rate of a simple, unbiased ring laser gyroscope 10 is reduced to the lock-in threshold rate $\Omega_L$, the counterpropagating beams lock at the same frequency. The frequencies of the counterpropagating beams are the same for a range of rotation rates $\pm\Omega_L$, which is the lock-in deadband shown in FIG. 4. The signal output from the ring laser gyroscope 10 becomes non-linear in the vicinity of the deadband, which is a departure from the output of an ideal ring laser gyroscope.

Figure 5:
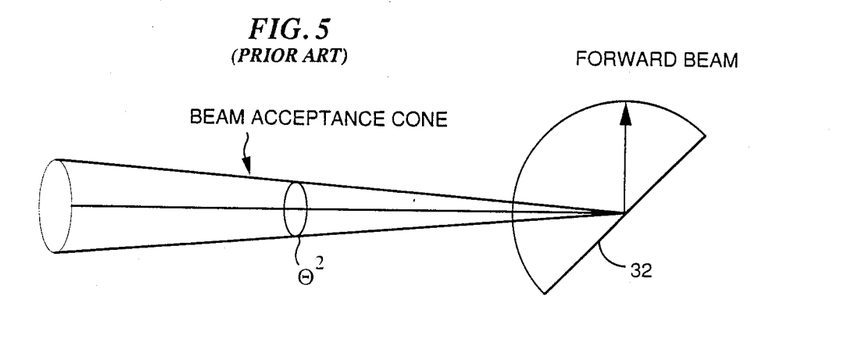
FIG. 5 illustrates forward reflected and backscattered light from a mirror of the type that may be included in the ring laser gyroscope of FIG. 1.

Referring to FIG. 5, lock-in is caused primarily by radiation backscattered from the mirrors 32-35. Since the counterpropagating beams strike each of the mirrors 32-35 at an angle of incidence of 45°, there would be no backscattered radiation from ideal, perfectly flat mirrors. The main portion of each beam is forward reflected from the mirror 32, for example, according to the laws of reflection. However, even though the mirrors 32-35 are of very high quality, surface imperfections cause some specular reflection of each beam in all directions. Light from one beam that is backscattered into an acceptance solid angle for the oppositely directed beam couples thereto. The acceptance solid angle depends upon the wavelength of the light and the diameter of the cavity 30. For a typical square ring laser gyroscope 10 having a 45° angle of incidence, about one part in $10^6$ of the total specular reflection from any one of the mirrors 32-35 is scattered into the acceptance angle of the counterpropagating beam.

Figure 6A:
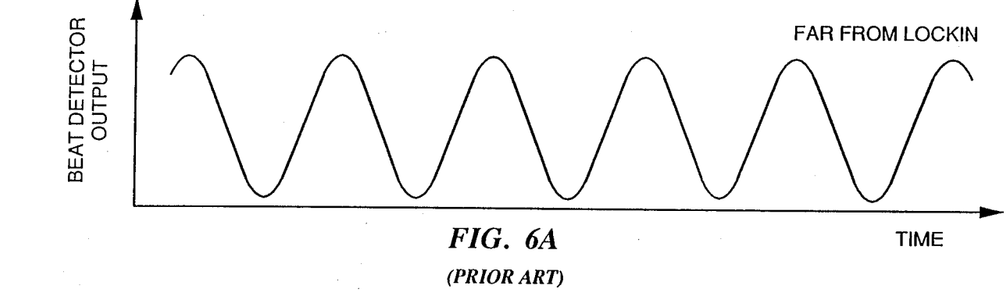
FIGS. 6A and 6B illustrate the output waveform of the ring laser gyroscope of FIG. 1 for rotation rates far from the lock-in threshold and near the lock-in threshold, respectively.
Figure 6B:
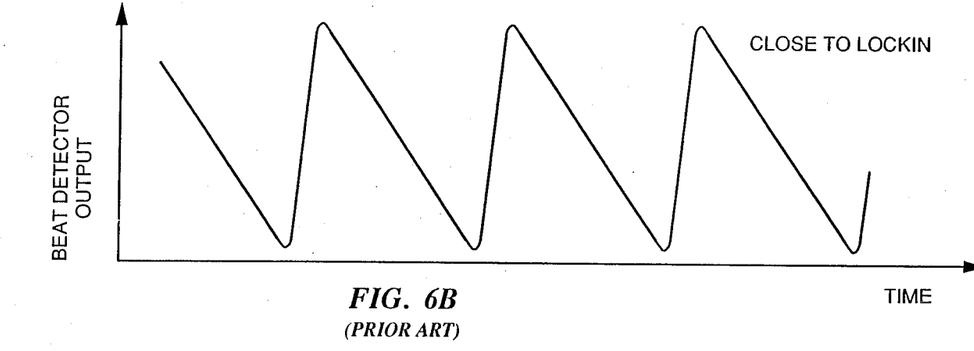
Figure 7A:
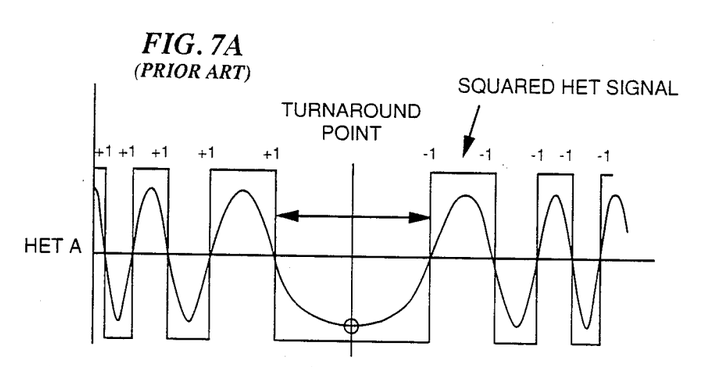
FIG. 7A graphically illustrates analog and digital signals representative of the outputs of two heterodyne photodetectors included in the ring laser gyroscope of FIG. 1 just before a turnaround in the dither motion.
Figure 7B:
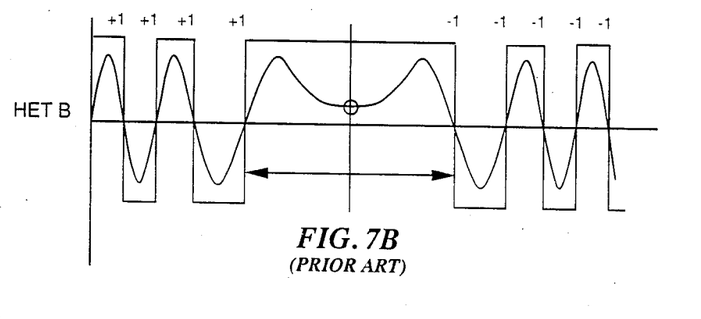
FIG. 7B graphically illustrates analog and digital signals representative of the outputs of two heterodyne photodetectors included in the ring laser gyroscope of FIG. 1 just after a turnaround in the dither motion.

Referring to FIG. 6A, the output of the detector 50 as a function of time is sinusoidal when the rotation rate is far from the lock-in threshold. Referring to FIG. 6B, when the rotation rate is near the lock-in threshold, the output of the detector 50 is distorted from the desired sinusoidal waveform. For a typical ring laser gyroscope having a cavity length of 28 cm, the lock-in threshold is about 100°/hr. Therefore, obtaining satisfactory results from the ring laser gyroscope 10 requires avoidance not only of lock-in but also avoidance of the rotation rates near the deadband.

Even with dither the residual effects of coupling between the counter propagating beams are not negligible. For low rotation rates an error arises in the ring laser gyroscope 10 at points of reversal of the direction of the dither oscillations. This error, while random, is a major source of error in ring laser rotation sensors. The nature of the residual lock-in error is white noise in angle rate leading to a random walk in the output angle of the ring laser gyro. Random walk is parameterized by the laser gyro random walk coefficient. The mathematical relationship between the lock-in coefficient, the dither parameters, and the random walk coefficient is derived by Hammons and Ashby, "Mechanically Dithered RLG at the Quantum Limit", IEEE NAECON 1978, which is hereby incorporated by reference into the present disclosure.

Figure 8:
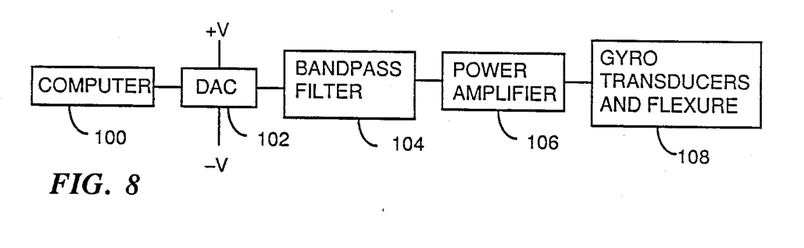
FIG. 8 is a generalized block diagram of the dither drive system according to the invention.

Referring to FIG. 8, a computer 100 provides a signal to a digital to analog converter 102. The computer 100 may comprise a microprocessor (not shown) that writes to the digital to analog converter 102 at a high rate, for example 2048 Hz or 2400 Hz. A register in the computer 100 is incremented at each iteration to determine the state of the drive waveform provided to the digital to analog converter 102. The increment is directly proportional to the drive frequency. The register may be used essentially as an index to a sine look-up table. For typical dither frequencies in the 400 Hz range, about five points per cycle will be used, which will generate a single frequency drive.

The output of the digital to analog converter 102 is input to a bandpass filter 104 having a pass band that includes signals in the frequency range of 130 Hz to 1200 Hz. The purpose of the filter 104 is to provide a near zero phase error at the dither frequency. It has been found that having the pass band include frequencies ranging from about one third to three times the dither frequency provides satisfactory performance. The output of the filter is input to a power amplifier 106, which then applies the amplified drive signals to the piezoelectric transducers 16A, 16B, 17A, 17B, 18A, 18B.

Since a typical flexure has a mechanical Q of about 300, a single frequency drive signal is not essential. Because of the high Q, the flexure will oscillate principally at its resonant frequency so that the flexure 14 itself acts as a highly effective filter to remove harmonics. Therefore, the register may be used to toggle the drive signal to either positive or negative value, which generates an essentially square wave having a desired average frequency but with considerable phase jitter in the short term. Amplitude control is achieved by adjusting the level written to the digital to analog converter 102.

The drive signal is noisy and includes drive harmonics in addition to low frequency components due to phase jitter. Because of the high Q of the flexure, application of the noisy drive signal to the piezoelectric transducers causes a resulting motion that is almost entirely at the fundamental frequency. Therefore no look-up table is required. All that is needed is a test on the sign bit of the register used for frequency generation.

The bandpass filter 104 prevents excitation of resonances in the crystals used to form the piezoelectric transducers. The filter 104 provides a near-zero phase in the frequency range of interest while attenuating both the high and low frequencies. The circuitry of FIG. 8 permits the use of an AC coupled power amplifier stage, which permits simplification of the required circuitry for interfacing the amplifier and the piezoelectric transducers.

Figure 9A:
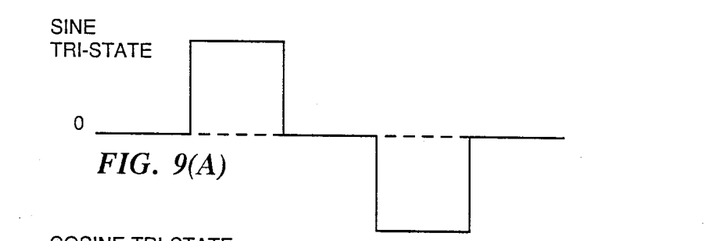
FIG. 9(A)-9(C) illustrate waveforms that may be output from the system illustrated in FIGS. 1-8.
Figure 9B:
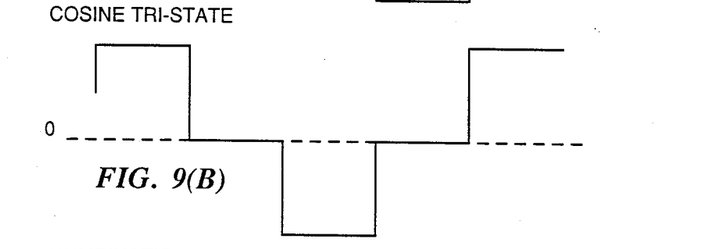
Figure 9C:
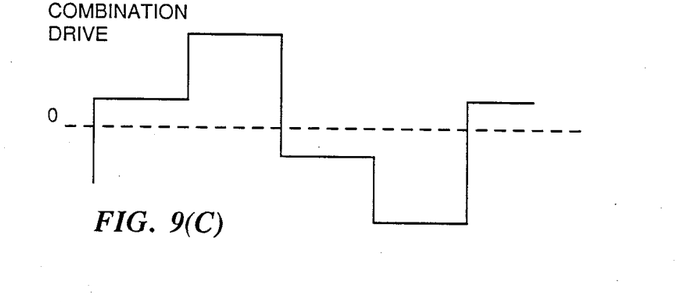

With no additional hardware, it is possible to generate quadrature drive signals by using the sine and cosine tri-state waves as shown in FIGS. 9(A) and 9(B). Drive signals of an arbitrary phase can be formed by weighting the sine and cosine signals. The combination of the sine and cosine signals is a waveform with four possible states. The frequency generator then may use only the top two bits of the counter register to address the appropriate state. These bits may also be used as the demodulator key to provide in-phase and quadrature references.

Figure 10:
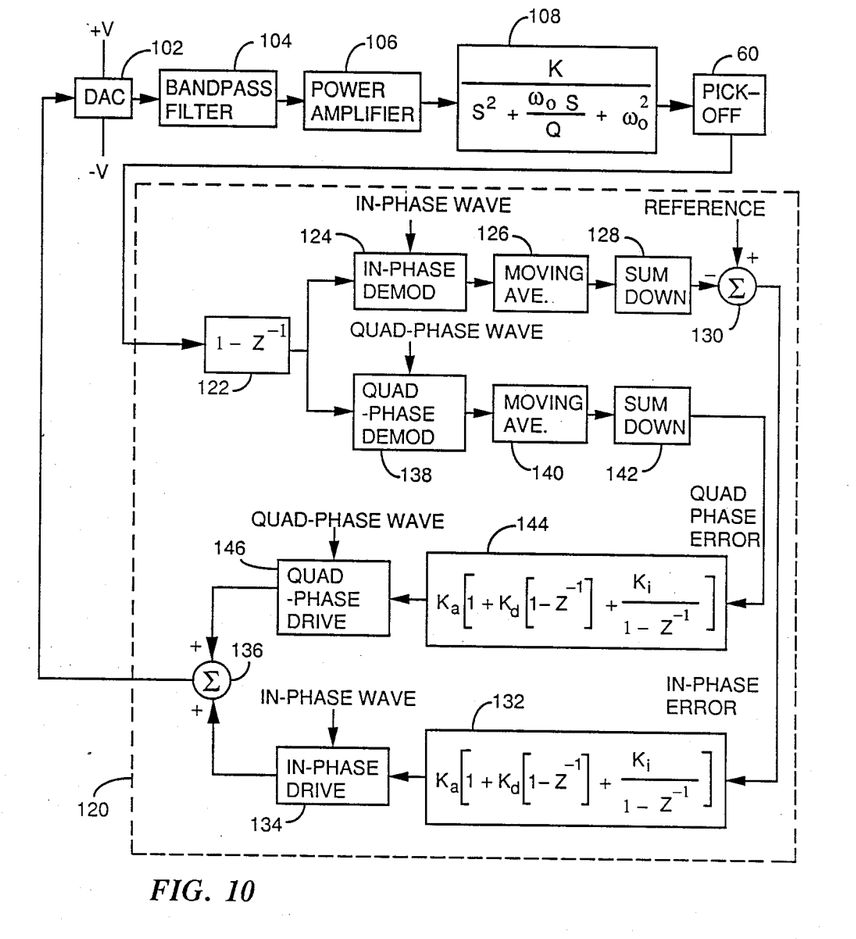
FIG. 10 is a more detailed block diagram of the dither drive system according to the invention.

FIG. 10 is a block diagram of a preferred embodiment of a drive circuit, a flexure and a controller that may be used to practice the invention. The system computer generates in-phase and quadrature phase drive signals. A weighted sum of the signals is supplied to the piezoelectric transducers to provide the capability of adjusting both the amplitude and phase. The output of the gyro pickoff is then demodulated with the two phases of the drive signal.

FIG. 10 shows the hardware of FIG. 8 connected to a software block 120. The effect the drive signal has on the mechanical system that comprises the flexure and the frame may be described by a transfer function that is the transformation of the drive signal to the signal at the gyro pickoff 60. The transfer function of the mechanical system that comprises the flexure and the frame is the same form as that of a second order resonant circuit. The form of the transfer function is well-known from analyses of the differential equations that describe second order resonances in both mechanical and electrical systems. The transfer function of the mechanical system may be written as the Laplace transform $$\frac{K}{s^2 + \frac{\omega_0 s}{Q} + \omega_o^2}$$

where K is an amplitude constant, $\omega_o$ is the resonant frequency, $\omega$ is the frequency domain variable and s is the time domain differential operator. The specific numerical values to be used in the transfer function depend on the structure and mass of the flexure 14 and the moment of inertial of the frame 20 for oscillations about the sensing axis. The signal output from the pickoff 60 may then be demodulated to determine the amplitude of the dither and the phase of the dither relative to the drive signal. It is generally desirable to have the dither motion in phase with the drive signal.

The software block 120 first applies a Z transformation indicated by the block 122 to the output signal output from the pickoff 60. A demodulator 124 demodulates the transformed signal with the in-phase wave. The demodulated wave is then input to an averaging block 126, which may be a filter that forms a moving average having a length of 8 samples. The averaged signal is then input to a sum down block 128, which sums the signal down from 2048 Hz to 256 Hz, for example. The summed down signal is subtracted in a summing block 130 from a reference value to form an in-phase error signal. A frequency response compensating block 132 applies direct, differential and integral gain to the in-phase error signal. After compensation the signal is used to set the amplitude of the in-phase wave in an in-phase drive amplitude block 134.

The output of the transformation block 122 is also input to a quadrature phase demodulator 138, which demodulates the signal with the quadrature phase wave. The demodulated signal is then input to a moving average block 140 that is substantially identical with the moving average block 126. The output of the moving average block is then input to a sum down block 142. The signal is then input to a compensation block 144 that is substantially identical to the compensation block 132. After compensation, the signal is used to set the amplitude of the quadrature phase wave in a quadrature phase drive amplitude block 146.

The in-phase and quadrature waveforms from the in-phase drive 134 and the quadrature phase drive 146, respectively, are added together in a summer 136, and the resulting signal is applied to the digital to analog converter 102. A delay of one 256 Hz iteration is incurred because data from one iteration is used to form a drive signal for the next iteration. The combination of the sampling and the moving average injects another half cycle delay. Computation typically requires a delay of an additional half cycle. Therefore, two 256 Hz cycle delays should be included in the loop.

Figure 11:
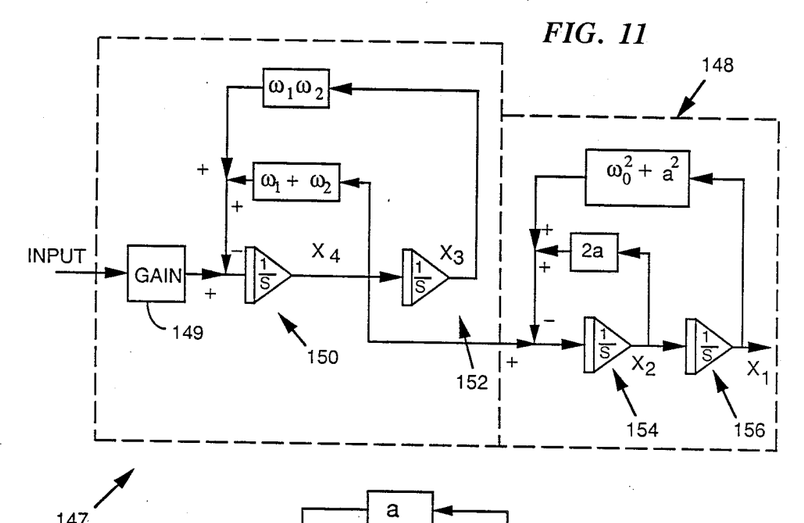
FIG. 11 is a state diagram illustrating a model of a filter that may be included in the system of FIG. 8 connected to a dither flexure of a type that may be included in the ring laser gyroscope of FIGS. 1 and 2.

FIG. 11 is a state diagram for a model of the filter 104 and the flexure 14. The filter 104 is represented by a bandpass network 147, and the flexure 14 is represented by the state diagram 148 of a classic second order resonant circuit. The bandpass network 147 includes a gain circuit 149 and a pair of integrators 150 and 152. The output of the integrator 150 is $x_4$ and the output of the integrator 152 is $x_3$. The state diagram 148 includes a pair of integrators 154 and 156. The output of the integrator 154 is $x_2$ and the output of the integrator 156 is $x_1$. Using the model of FIG. 11, the combined filter and flexure 14 may be represented by the state equation:

$$\begin{vmatrix} \dot{x}_1 \\ \dot{x}_2 \\ \dot{x}_3 \\ \dot{x}_4 \end{vmatrix} = \begin{vmatrix} 0 & 1 & 0 & 0 \\ -(\omega_0^2 + a^2) & -2a & 0 & 1 \\ 0 & 0 & 0 & 1 \\ 0 & 0 & -\omega_1\omega_2 & -(\omega_1 + \omega_1) \end{vmatrix} \begin{vmatrix} x_1 \\ x_2 \\ x_3 \\ x_4 \end{vmatrix} + \begin{vmatrix} 0 \\ 0 \\ 0 \\ F \end{vmatrix}$$

The Laplace transform of the state equation is $$\begin{vmatrix} s & -1 & 0 & 0 \\ (\omega_0^2 + a^2)s + 2a & 0 & -1 \\ 0 & 0 & s & -1 \\ 0 & 0 & \omega_1\omega_2 s + \omega_1 + \omega_2 \end{vmatrix} \begin{vmatrix} x_1 \\ x_2 \\ x_3 \\ x_4 \end{vmatrix} = \begin{vmatrix} 0 \\ 0 \\ 0 \\ \frac{F}{s} \end{vmatrix}$$

where the filter is represented by the function $$\frac{\omega_2 s}{(s + \omega_1)(s + \omega_2)}$$

and the flexure is represented by the function $$\frac{1}{I} \cdot \frac{1}{(s + a)^2 + \omega_0^2},$$

where I is the moment of inertia of the flexure 14 and frame 20 and $\omega_1$ and $\omega_2$ are the lower and upper bounding frequencies, respectively, of the bandpass filter. The Laplace transform can be written as $$\begin{vmatrix} s & -1 & 0 & 0 \\ k_2 s + k_1 & 0 & -1 \\ 0 & 0 & s & -1 \\ 0 & 0 & k_4 s + k_3 \end{vmatrix} \begin{vmatrix} x_1 \\ x_2 \\ x_3 \\ x_4 \end{vmatrix} = \begin{vmatrix} 0 \\ 0 \\ 0 \\ \frac{F}{s} \end{vmatrix}$$

where $k_1 = 2a$; $k_2 = \omega_0^2 + a^2$; $k_3 = \omega_1 + \omega_2$; and $k_4 = \omega_1 \omega_2$. Solution of the equations requires inversion of the matrix on the left side of the Laplace transform and evaluation of the transforms. The inverse matrix is $$\begin{vmatrix} \dfrac{s+2a}{(s+a)^2+\omega_0^2} & \dfrac{1}{(s+a)^2+\omega_0^2} & \dfrac{-\omega_1\omega_2}{((s+a)^2+\omega_0^2)(s+\omega_1)(s+\omega_2)} & \dfrac{s}{((s+a)^2+\omega_0^2)(s+\omega_1)(s+\omega_2)} \\ \dfrac{-(\omega_0^2+a^2)}{(s+a)^2+\omega_0^2} & \dfrac{s}{(s+a)^2+\omega_0^2} & \dfrac{-\omega_1\omega_2 s}{((s+a)^2+\omega_0^2)(s+\omega_1)(s+\omega_2)} & \dfrac{s^2}{((s+a)^2+\omega_0^2)(s+\omega_1)(s+\omega_2)} \\ 0 & 0 & \dfrac{s+\omega_1+\omega_2}{(s+\omega_1)(s+\omega_2)} & \dfrac{1}{(s+\omega_1)(s+\omega_2)} \\ 0 & 0 & \dfrac{-\omega_1\omega_2}{(s+\omega_1)(s+\omega_2)} & \dfrac{s}{(s+\omega_1)(s+\omega_2)} \end{vmatrix}$$

A considerable effort is required to invert these transforms. The solutions are:

$$\dfrac{1}{(s+a)^2+\omega_0^2} \longrightarrow \dfrac{1}{\omega_0} e^{-at}\sin\omega_0 t \equiv F_{11}$$

$$\dfrac{s}{(s+a)^2+\omega_0^2} \longrightarrow \dfrac{-a}{\omega_0} e^{-at}\sin\omega_0 t + e^{-at}\cos\omega_0 t \equiv F_{12}$$

$$\dfrac{1}{((s+a)^2+\omega_0^2)(s+\omega_1)(s+\omega_2)} \longrightarrow$$

$$A_0 e^{-\omega_1 t} + B_0 e^{-\omega_2 t} + C_0 e^{-at}\cos\omega_0 t + D_0 e^{-at}\sin\omega_0 t \equiv F_{21}$$

$$\dfrac{s}{((s+a)^2+\omega_0^2)(s+\omega_1)(s+\omega_2)} \longrightarrow$$

$$A_1 e^{-\omega_1 t} + B_1 e^{-\omega_2 t} + C_1 e^{-at}\cos\omega_0 t + D_1 e^{-at}\sin\omega_0 t \equiv F_{22}$$

$$\dfrac{s^2}{((s+a)^2+\omega_0^2)(s+\omega_1)(s+\omega_2)} \longrightarrow$$

$$A_2 e^{-\omega_1 t} + B_2 e^{-\omega_2 t} + C_2 e^{-at}\cos\omega_0 t + D_2 e^{-at}\sin\omega_0 t \equiv F_{23}$$

$$\dfrac{1}{s(s+\omega_1)(s+\omega_2)} \longrightarrow \dfrac{1}{\omega_1\omega_2} -$$

$$\dfrac{1}{\omega_2-\omega_1}\left[\dfrac{e^{-\omega_1 t}}{\omega_1} - \dfrac{e^{-\omega_2 t}}{\omega_2}\right] \equiv F_{30}$$

$$\dfrac{1}{(s+\omega_1)(s+\omega_2)} \longrightarrow \dfrac{1}{\omega_2-\omega_1}[e^{-\omega_1 t} - e^{-\omega_2 t}] \equiv F_{31}$$

$$\dfrac{s}{(s+\omega_1)(s+\omega_2)} \longrightarrow$$

$$\dfrac{-1}{\omega_2-\omega_1}[\omega_1 e^{-\omega_1 t} - \omega_2 e^{-\omega_2 t}] \equiv F_{32}$$

The coefficients are defined by:

$$A_0 = \dfrac{1}{\omega_2-\omega_1} \cdot \dfrac{1}{a^2 - 2\omega_1 a + \omega_1^2 + \omega_0^2}$$

$$B_0 = \dfrac{1}{\omega_1-\omega_2} \cdot \dfrac{1}{a^2 - 2\omega_2 a + \omega_2^2 + \omega_0^2}$$

$$C_0 = \dfrac{2a - \omega_2 - \omega_1}{(a^2 - 2a\omega_1 + \omega_1^2 + \omega_0^2)(a^2 - 2a\omega_2 + \omega_2^2 + \omega_0^2)}$$

$$D_0 = \dfrac{1}{\omega_0}\left(\dfrac{(\omega_1 - 2a)(\omega_2 - 2a) - (a^2 + \omega_0^2)}{(a^2 - 2a\omega_1 + \omega_1^2 + \omega_0^2)(a^2 - 2a\omega_2 + \omega_2^2 + \omega_0^2)} - aC_0\right)$$

$$A_1 = -\omega_1 A_0$$

$$B_1 = -\omega_2 B_0$$

-continued $$C_1 = \omega_0 D_0 - aC_0$$

$$D_1 = -(\omega_0 C_0 + aD_0)$$

$$A_2 = \omega_1^2 A_0$$

$$B_2 = \omega_2^2 B_0$$

$$C_2 = -((\omega_0^2 - a^2)C_0 + 2a\omega_0 D_0)$$

$$D_2 = 2a\omega_0 C_0 - (\omega_0^2 - a^2)D_0$$

Using matrix inversion techniques on the Laplace transform given above, the solution may be written as:

$$\begin{vmatrix} x_1^{n\Delta t} \\ x_2^{n\Delta t} \\ x_3^{n\Delta t} \\ x_4^{n\Delta t} \end{vmatrix} =$$

$$\begin{vmatrix} F_{12} + 2aF_{11} & F_{11} & -\omega_1\omega_2 F_{21} & F_{22} \\ -(\omega_0^2 + a^2)F_{11}F_{12} & & -\omega_1\omega_2 F_{22} & F_{23} \\ 0 & 0 & F_{32} + (\omega_1 + \omega_2)F_{31}F_{31} & \\ 0 & 0 & -\omega_1\omega_2 F_{31} & F_{32} \end{vmatrix} \begin{vmatrix} x_1^{(n-1)\Delta t} \\ x_2^{(n-1)\Delta t} \\ x_3^{(n-1)\Delta t} \\ x_4^{(n-1)\Delta t} \end{vmatrix} +$$

$$\begin{vmatrix} -F_{21} \\ -F_{22} \\ F_{30} \\ F_{31} \end{vmatrix} *\text{Drive}^{(n-1)\Delta t}$$

where the $F_{ij}$ are evaluated using the definitions provided above at $t = \Delta t$. Therefore, these $F_{ij}$ are constants.

Figure 12:
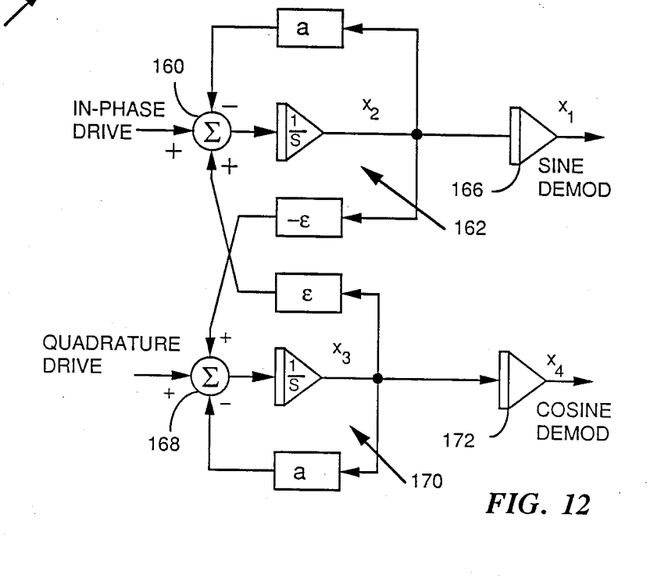
FIG. 12 is a simplified state diagram for describing low frequency behavior of the system of FIG. 10.

The model shown in FIG. 12 is a simplified representation of the low frequency behavior of the demodulator. The signal output of the system of FIG. 12 represents the envelope of the flexure oscillations at low frequency. The in-phase drive signal is input to a summer 160 that provides an output to an integrator 162. The signal output by the integrator 162 represents $x_2$. The output of the integrator 162 is then input to a second integrator 166, which produces an output signal indicative of $x_1$, the sine demodulator. The output of the integrator 162 is multiplied by a constant a and then fed back into the summer 160. The output of the integrator 162 is multiplied by a constant $-\epsilon$ and then fed into into a summer 168. The summer 168 also receives the quadrature drive input signal as an input. The output of the summer 168 is input to an integrator 170. The signal output by the integrator 170 represents $x_3$. The output of the integrator 170 is then input to a second integrator 172, which produces an output signal indicative of $x_4$, the cosine demodulator. The output of the integrator 170 is multiplied by a constant a and then fed back into the summer 168. The output of the integrator 168 is multiplied by a constant $\epsilon$ and then fed into the summer 160. The state equations and Laplace transforms are simpler than those given above for the model shown in FIG. 11. The state differential equation is $$\begin{vmatrix} \dot{x}_1 \\ \dot{x}_2 \\ \dot{x}_3 \\ \dot{x}_4 \end{vmatrix} = \begin{bmatrix} 0 & 1 & 0 & 0 \\ 0 & -a & \epsilon & 0 \\ 0 & -\epsilon & -a & 0 \\ 0 & 0 & 1 & 0 \end{bmatrix} \begin{vmatrix} x_1 \\ x_2 \\ x_3 \\ x_4 \end{vmatrix} + \begin{vmatrix} 0 \\ D_s \\ D_c \\ 0 \end{vmatrix}$$

The Laplace transform for the simplified model is $$\begin{vmatrix} s & -1 & 0 & 0 \\ 0 & s+a & -\epsilon & 0 \\ 0 & \epsilon & s+a & 0 \\ 0 & 0 & -1 & s \end{vmatrix} \begin{vmatrix} x_1 \\ x_2 \\ x_3 \\ x_4 \end{vmatrix} = \begin{vmatrix} x_{10} \\ x_{20} \\ x_{30} \\ x_{40} \end{vmatrix} + \begin{vmatrix} 0 \\ \frac{D_s}{s} \\ \frac{D_c}{s} \\ 0 \end{vmatrix}$$

The solution of the equations for $x_2$ and $x_3$ is $$\begin{vmatrix} x_2 \\ x_3 \end{vmatrix} = \frac{1}{(s+a)^2 + \epsilon^2} \begin{vmatrix} s+a & \epsilon \\ -\epsilon & s+a \end{vmatrix} \begin{vmatrix} x_{20} \\ x_{30} \end{vmatrix} + \begin{vmatrix} \frac{D_s}{s} \\ \frac{D_c}{s} \end{vmatrix}$$

The solutions for $x_1$ and $x_4$ are given by $$x_1 = \frac{x_2}{s} + \frac{x_{10}}{s}$$

and $$x_4 = \frac{x_3}{s} + \frac{x_{40}}{s}.$$

Using $F_{11}$ and $F_{12}$ as previously defined with $\omega_o$ replaced by $\epsilon$ and defining the following:

$$F_{10} = \frac{1}{a^2 + \epsilon^2} \left( 1 - e^{-at} \left( \frac{a}{\epsilon} \sin\epsilon t + \cos\epsilon t \right) \right)$$

and $$F_{1-1} = \frac{1}{a^2 + \epsilon^2} \left( t - \frac{2a}{a^2 + \epsilon^2} (1 - e^{-at}\cos\epsilon t) + \frac{a^2 - \epsilon^2}{a^2 + \epsilon^2} e^{-at}\sin\epsilon t \right),$$

the solution propagator can be written as $$\begin{vmatrix} x_1^{n\Delta t} \\ x_2^{n\Delta t} \\ x_3^{n\Delta t} \\ x_4^{n\Delta t} \end{vmatrix} = \begin{vmatrix} 1F_{11} + aF_{10} & \epsilon F_{10} & 0 \\ 0F_{12} + aF_{11} & \epsilon F_{11} & 0 \\ 0 & -\epsilon F_{11} & F_{12} + aF_{11} 0 \\ 0 & -\epsilon F_{10} & F_{11} + aF_{10} 1 \end{vmatrix} \begin{vmatrix} x_1^{(n-1)\Delta t} \\ x_2^{(n-1)\Delta t} \\ x_3^{(n-1)\Delta t} \\ x_4^{(n-1)\Delta t} \end{vmatrix} +$$

$$\begin{vmatrix} F_{10} + aF_{1-1} & \epsilon F_{1-1} \\ F_{11} + aF_{10} & \epsilon F_{10} \\ -\epsilon F_{10} & F_{11} + aF_{10} \\ -\epsilon F_{1-1} & F_{10} + aF_{1-1} \end{vmatrix} \begin{vmatrix} D_s^{(n-1)\Delta t} \\ D_c^{(n-1)\Delta t} \end{vmatrix}$$

with the $F_{ij}$ constants evaluated at $t = \Delta t$. The solution propagator is a matrix used to update the solution from one iteration to the next.

Figure 13:
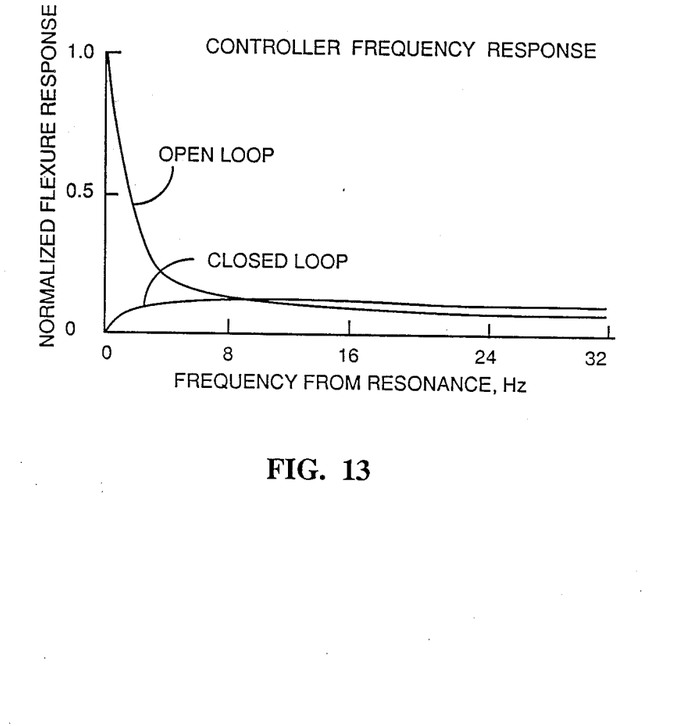
FIG. 13 graphically illustrates flexure response to external disturbances for both open and closed loop systems.

FIG. 13 is a plot of the response of the flexure to external disturbances. Both the open loop response and the closed loop response are shown. The controller greatly attenuates disturbances within its bandwidth.

The structures and methods illustrated and described herein illustrate the principles of the present invention. Modifications to the invention as illustrated and described herein may be made without departing from the spirit of the present invention. Therefore the present invention includes the subject matter defined by the appended claims and all reasonable equivalents.

What is claimed is:

1. A dither drive system for a ring laser gyroscope that includes a frame mounted to a flexure having a resonant frequency, the flexure being mounted between a base and the frame such that the frame may be dithered relative to the base, comprising:
    means for forming a digital dither signal indicative of the dither frequency;
    means for producing a first digital dither drive signal that is in-phase with the digital dither signal;
    means for producing a second digital dither drive signal that is in quadrature with the digital dither signal;
    means for converting the first and second digital dither drive signals into corresponding analog dither drive signals; and
    means for applying the analog dither drive signals to the flexure to drive the flexure at its resonant frequency.

2. A dither drive system for a ring laser gyroscope that includes a frame mounted to a flexure having a resonant frequency, the flexure being mounted between a base and the frame such that the frame may be dithered in an oscillatory motion relative to the base, comprising:
    means for forming a digital signal indicative of the dither oscillations;
    means for producing a first digital waveform that corresponds to a specified dither drive signal and frequency, the first digital waveform being in-phase with the digital signal indicative of the dither;
    means for producing a second digital waveform that corresponds to a specified dither drive signal and frequency, the second digital waveform being in quadrature with the digital signal indicative of the dither;
    means for driving the flexure with analog signals indicative of the first and second digital waveforms;
    means for demodulating the digital signal indicative of the dither oscillations with the first digital waveform to obtain an in-phase error signal;
    means for demodulating the digital signal indicative of the dither oscillations with the second digital waveform to obtain a quadrature phase error signal; and means for nulling the quadrature phase error signal and servoing the inphase error signal to a predetermined reference value.

3. A dither drive system for a ring laser gyroscope that includes a frame mounted to a base by flexure springs for dithering the frame about a defined sensing axis relative to the base, comprising:

means for producing a dithering signal that is a measure of the dithering motion of the frame relative to the base;

means for producing a first sinusoidal signal having a frequency substantially at a predetermined resonant frequency of the flexure and frame;

means for producing a second sinusoidal signal in phase quadrature with and at the same frequency as the first sinusoidal signal;

means for determining the difference in phase between the dithering signal and the first sinusoidal signal to produce an in phase error signal;

means for determining the difference in phase between the dithering signal and the second sinusoidal signal to produce a quadrature phase error signal; and means for nulling the quadrature phase error signal and for servoing the in-phase error signal to a predetermined reference value.

4. The dither drive system of claim 3 wherein the means for producing a first sinusoidal signal and means for producing a second sinusoidal signal each comprise means for producing a digitally approximated sinusoidal signal.

5. The dither drive system of claim 4 wherein the digitally approximated signals have two stepped amplitude values.

6. The dither drive system of claim 4 wherein the digitally approximated signals have three stepped amplitude values.

7. The dither drive system of claim 4 including means for digitally approximating the dithering signal.

8. The dither drive system of claim 7 wherein the digitally approximated signals have two stepped amplitude values.

9. The dither drive system of claim 7 wherein the digitally approximated signals have three stepped amplitude values.

10. The dither drive system of claim 4,5,6,7,8, or 9 further comprising digital to analog conversion means for converting the digitally approximated signals into sinusoidal analog signals with the same phase relation.

11. A method for controlling a dither drive system for a ring laser gyroscope that includes a frame mounted to a flexure having a resonant frequency, the flexure being mounted between a base and the frame such that the frame may be dithered relative to the base, comprising the steps of:

forming a digital dither signal indicative of the dither frequency;

producing a first digital dither drive signal that is in-phase with the digital dither signal;

producing a first digital dither drive signal that is in-phase with the digital dither signal;

converting the first and second digital signals into corresponding analog dither drive signals; and applying the analog dither drive signals to the flexure to drive the flexure at its resonant frequency.

12. A method for controlling a dither drive system for a ring laser gyroscope that includes a frame mounted to a flexure having a resonant frequency, the flexure being mounted between a base and the frame such that the frame may be dithered in an oscillatory motion relative to the base, comprising the steps of:

forming a digital signal indicative of the dither oscillations;

producing a first digital waveform that corresponds to a specified dither drive signal and frequency, the first digital waveform being in-phase with the digital signal indicative of the dither;

producing a second digital waveform that corresponds to a specified dither drive signal and frequency, the second digital waveform being in quadrature with the digital signal indicative of the dither;

driving the flexure with analog signals indicative of the first and second digital waveforms;

demodulating the digital signal indicative of the dither oscillations with the first digital waveform to obtain an in-phase error signal;

demodulating the digital signal indicative of the dither oscillations with the second digital waveform to obtain a quadrature phase error signal; and nulling the quadrature phase error signal and servoing the in-phase error signal to a predetermined reference value.

13. A method for controlling a dither drive system for a ring laser gyroscope that includes a frame mounted to a base by flexure springs for dithering the frame about a defined sensing axis relative to the base, comprising the steps of:

producing a dithering signal that is a measure of the dithering motion of the frame relative to the base;

producing a first sinusoidal signal having a frequency substantially at a predetermined resonant frequency of the flexure and frame;

producing a second sinusoidal signal in phase quadrature with and at the same frequency as the first sinusoidal signal;

determining the difference in phase between the dithering signal and the first sinusoidal signal to produce an in phase error signal;

determining the difference in phase between the dithering signal and the second sinusoidal signal to produce a quadrature phase error signal; and nulling the quadrature phase error signal and for servoing the in-phase error signal to a predetermined reference value.

14. The method of claim 13 wherein the steps of producing a first sinusoidal signal and means for producing a second sinusoidal signal each comprise the step of producing a digitally approximated sinusoidal signal.

15. The method of claim 13 including the step of forming the first and second digital waveforms to have two stepped amplitude values.

16. The method of claim 13 including the step of forming the first and second digital waveforms to have three stepped amplitude values.

17. The dither drive system of claim 14 including the step of digitally approximating the dithering signal.

18. The dither drive system of claim 17 including the step of forming the digitally approximated signals have two stepped amplitude values.

19. The dither drive system of claim 17 including the step of forming the digitally approximated signals have three stepped amplitude values.

20. The dither drive system of claim 17, 18, or 19 further comprising the step of converting the digitally approximated signals into sinusoidal analog signals with the same phase relation.

* * * * *